United States Patent [19]

Concannon

[11] 4,087,394

[45] May 2, 1978

[54] AQUEOUS DISPERSIONS OF PERFLUOROOLEFIN POLYMERS CONTAINING FILM-FORMING MATERIALS

[75] Inventor: Thomas Patrick Concannon, Newtown Square, Pa.

[73] Assignee: E. I. Du Pont de Nemours and Company, Wilmington, Del.

[21] Appl. No.: 742,533

[22] Filed: Nov. 10, 1976

Related U.S. Application Data

[63] Continuation of Ser. No. 546,999, Feb. 4, 1975, abandoned.

[51] Int. Cl.$^2$ ............................................. C08L 27/18
[52] U.S. Cl. ...................... 260/29.6 F; 260/29.6 RW; 260/857 UN; 260/857 L
[58] Field of Search ................. 260/29.6 F, 29.6 RW, 260/857 UN, 857 L

[56] References Cited

U.S. PATENT DOCUMENTS

| | | | |
|---|---|---|---|
| 2,976,257 | 3/1961 | Dawe et al. | 260/14 |
| 3,055,852 | 9/1962 | Youse | 260/17 |
| 3,224,094 | 12/1965 | Esemplane | 30/346 |
| 3,294,871 | 12/1966 | Schmitt et al. | 260/900 |
| 3,661,831 | 5/1972 | Fang | 260/32.8 A |
| 3,787,338 | 1/1974 | Skelly | 260/29.6 F |

*Primary Examiner*—M. J. Welsh

[57] ABSTRACT

Aqueous dispersions of polymers of tetrafluoroolefin and tetrafluoroolefin/hexafluoropropylene containing other film-forming materials such as polyamide acid salts or polymeric quaternary hydroxides blended with nitrogen-resins and articles coated or impregnated with these dispersions are provided.

Coatings prepared from such dispersions provide lubricity, release properties, chemical and high temperature resistance, and electrical insulation for a wide variety of substrates such as metals, ceramics and the like.

27 Claims, No Drawings

AQUEOUS DISPERSIONS OF PERFLUOROOLEFIN POLYMERS CONTAINING FILM-FORMING MATERIALS

CROSS REFERENCE TO RELATED APPLICATIONS

This application is a continuation of Ser. No. 546,999, filed Feb. 4, 1975, now abandoned.

BACKGROUND OF THE INVENTION

1. Field of Invention

This invention is related to aqueous dispersions of perfluoroolefin polymers and particularly to coatings based on polymers of tetrafluoroethylene (TFE) and tetrafluoroethylene/hexafluoropropylene (HFP), containing other film-forming materials.

2. Description of Prior Art

Aqueous dispersions of PTFE and of TFE/HFP copolymers are well known in the prior art and can be used to coat or impregnate articles. These aqueous dispersions, however, have a tendency to coagulate irreversibly when subjected to heat, freezing, agitation or upon addition of electrolytes or water soluble solvents. Some of these short-comings can be eliminated when dispersions of these polymers are prepared in organic liquids. In many cases, however, these dispersions settle quickly and are often not suitable for commercial use.

When a dispersion in organic liquid also contains, in addition to a perfluoroolefin polymer, a film-forming material, a stable dispersion results. U.S. Pat. No. 3,661,831, issued May 9, 1972, to J. C. Fang, shows such stabilized dispersions of TFE/HFP copolymers, while U.S. Pat. application, Ser. No. 361,819, filed May 18, 1973, shows the use of stabilized PTFE dispersions. In both cases the dispersions are substantially anhydrous, that is, contain less than about 1% by weight of water.

Increased awareness, however, of the environmental hazards of allowing organic solvent vapors to enter the atmosphere, the desirability of a single system that can be applied not only by the more conventional techniques of spray or roller coating but also by electrodeposition, and the economy resulting from the substitution of water for some or all of the solvents in a coating composition, are all factors mitigating in favor of aqueous dispersions.

The aqueous dispersions of this invention contain a perfluoroolefin polymer which can be a polymer of TFE or of a mixture of TFE and HFP and a film-forming material such as a polyamide acid salt or a polymeric quaternary hydroxide blended with a nitrogen-resin, can be applied by a variety of techniques, and the fused/cured films obtained have excellent release properties, high lubricity and resistance to heat and chemicals, and are good electrical insulators.

SUMMARY OF THE INVENTION

According to the present invention there is provided an aqueous dispersion consisting essentially of:

(A) 20 to 80% by weight, based on the weight of (A) plus (B), of a perfluoroolefin polymer containing 5-100% by weight, based on the perfluoroolefin polymer, of tetrafluoroethylene and 95-0% by weight, based on the perfluoroolefin polymer, of hexafluoropropylene; and (B) 80 to 20% by weight, based on the weight of (A) plus (B), of a film-forming material such as a polyamide acid (as its salt) or a polymeric quaternary hydroxide blended with a nitrogen resin, said film-forming material being capable of forming a film below the fusion point of the perfluoroolefin polymer and acts as a binder for the perfluoroolefin polymer;

and, optionally, pigments, colorants, and stabilizers; wherein said dispersion comprises 5–50%, by weight of the dispersion, of (A) plus (B), the remainder being water and an organic liquid or a mixture of organic liquids not exceeding the weight of the water in the dispersion. Additionally, articles coated or impregnated with these dispersions are provided.

DESCRIPTION OF THE INVENTION

The aqueous dispersion of this invention contains a perfluoroolefin polymer and a water soluble or dispersible film-forming material in the dispersed phase and is capable of depositing, by roller or spray coating or by electrodeposition, a wet film which, upon baking at between 100° C and 370° C, provides a tough, continuous coating of high lubricity, chemical and heat resistance, and excellent electrical insulating and release properties. A variety of substrates, such as metal or ceramics can be coated with the dispersion of this invention.

The perfluoroolefin polymer comprises 20–80% by weight of the dispersed phase of the aqueous dispersion of this invention. This perfluoroolefin polymer contains 5–100% by weight of the polymer of TFE and 95–0% by weight of HFP.

The PTFE polymers to be utilized in this invention are aqueous dispersions or dry polymers and are well known in the art. They are described in, for example, U.S. Pat. No. 2,230,654, issued Feb. 4, 1941 to R. J. Plunkett.

The TFE/HFP copolymers to be utilized in this invention are also aqueous dispersions or dry polymers and are also well known in the art. Customarily, TFE/HFP weight ratios of 5-95/95-5 are included among the copolymers and preferably the 50-95/50-5 monomer weight ratios are utilized because of the increased stability of these dispersions. Most preferred are the 93-95/7-5, the 84-88/16-12, and the 75-80/25-20 copolymers. Methods for preparing such copolymers are described, for example, in U.S. Pat. No. 2,946,763, issued Mar. 29, 1957, to M. I. Bro et al.

The perfluoroolefin polymers used should have molecular weights in excess of about 20,000 (weight average, determined by melt viscosity measurements), materials below this level tend to be waxy and unsuitable for preparing aqueous dispersions. The perfluoroolefin polymers, as prepared in aqueous media, contain particles of 0.05–15 micron diameter and have an average particle size, when used as prepared in aqueous dispersions, near 0.2 micron. The particle size is measured by electron microscopy and the diameter of a particle is taken to be the average dimension of the substantially spherical particles.

The aqueous dispersion of this invention also contains 20–80%, by weight of the dispersed phase, of a film-forming material. The film-forming material can be soluble or dispersible in water and is capable of forming a substantially continuous film at or below the fusion temperature of the perfluoroolefin polymer. The film-forming material does not decompose at the temperatures required to form a film of the aqueous dispersion of this invention.

Use of these film-formers reduces the baking temperatures at which films of the dispersion are obtained, when compared to the temperatures required for perfluoroolefin polymers alone, by acting as a binder for the perfluoroolefin polymer particles. For example, when a TFE/HFP copolymer, having a monomer weight ratio of approximately 75/25, is utilized as the perfluoroolefin polymer portion of the dispersed phase, the baking temperature can be reduced by approximately 55° C and the time required for film formation is also shortened. This lower baking temperature allows the utilization of, for example, derivatives of epoxy resins (polymeric quaternary hydroxides), blended with nitrogen resins, as film-formers, which would be thermally unstable at the fusion point of the TFE/HFP copolymer.

Durable, heat-stable films containing PTFE or a TFE/HFP copolymer and a polyimide can be made by using an aqueous dispersion of the perfluoroolefin polymer blended with an aqueous solution a corresponding polyamide acid salt which is capable of polyimide formation at or below the fusion temperature of the perfluoroolefin polymer.

Aqueous solutions of polyamide acid precursors of polyimides can be prepared, for example, from the following components:

(a) 10 to 70% by weight, based on the solution, of a salt of a polyamide acid with a tertiary amine, wherein the polyamide acid is of the general formula

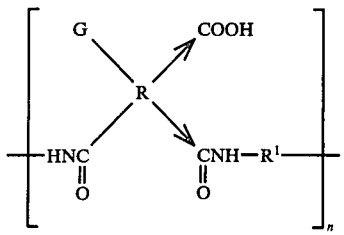

wherein G is a hydrogen atom or a carboxyl group; wherein the → denotes isomerism so that in any recurring unit within the polymeric structure the groups to which the arrows point may exist as shown or in an interchanged position; wherein R is an organic tetravalent radical containing at least two carbon atoms and no more than two carbonyl groups of each polyamide acid unit are attached to any one carbon atom; wherein $R^1$ is a divalent radical containing at least two carbon atoms, the amide groups of adjacent polyamide acid units are attached to separate carbon atoms of said divalent radical; and wherein $n$ is an integer sufficient to provide a polyamide acid having an inherent viscosity of at least 0.1, preferably 0.3–5.0, as measured as a 0.5% solution in N,N-dimethylacetamide at 30° C., and wherein said tertiary amine is present in at least a stoichiometrically equivalent amount to the free carboxylic acid groups in said polyamide acid;

(b) 5 to 25% by weight, based on the solution, of a viscosity reducing agent which is miscible with water and has a solubility parameter range of 10–21.6 wherein said solubility parameter has a dispersion component in the range of 7.0–10.0, a polar component in the range of 2.0–11.0, and a hydrogen bonding component in the range of 7.0–14.0; and (c) 5 to 35% by weight, based on the solution, of a coalescing agent, wherein said coalescing agent is at least one member selected from the group consisting of N-methylpyrrolidone, dimethyl formamide, dimethyl acetamide, dimethyl sulfoxide, cresylic acid, sulfolane, formamide;

and wherein water comprises 30–80% by weight of the solution.

Such polyamide acid salts are described in T. P. Concannon, U.S. Pat. application Ser. No. 546,998, filed simultaneously with the present application on Feb. 4, 1975, hereby incorporated by reference.

Hard films of good chemical and high temperature resistance can be prepared from an aqueous dispersion of this invention containing a perfluoroolefin polymer and a blend of a polymeric quaternary hydroxide with a nitrogen resin, where the blend is prepared from:

(a) 50–97 parts by weight, based on the weight of components (a) plus (c), of an epoxy resin containing, on the average, two terminal 1,2-epoxy groups per molecule' and having a molecular weight of 350–5,000, reacted with (b) an aqueous solution of 0.75–1.25 equivalents, per equivalent of epoxy group of said epoxy resin of (a), of a tertiary amine; and (c) 3–50 parts by weight, based on the weight of components (a) plus (c), of a nitrogen resin crosslinking agent or mixtures thereof;

dissolved or dispersed in water and an organic liquid or mixtures of such liquids wherein the water and the organic liquid are in a ratio of from 70:30 to 90:10 and the blend has a pH of 10 or above, and is described in E. Sommerfeld, U.S. Pat. application Ser. No. 547,000, filed simultaneously with the present application on Feb. 4, 1975, hereby incorporated by reference.

A blend of a polymeric quatenary hydroxide with a nitrogen resin can also be prepared from:

(a) 50–97 parts by weight, based on the weight of components (a) plus (c), of an epoxy polymer containing, on the average, more than two randomly distributed 1,2-epoxy groups per molecule and having a molecular weight of 470–2,000 or 25,000–75,000, reacted with (b) an aqueous solution of 0.75–1.25 equivalents, per equivalent of epoxy group of said epoxy polymer of (a), of a tertiary amine; and (c) 3–50 parts by weight, based on the weight of components (a) plus (c), of a nitrogen resin crosslinking agent or mixtures thereof;

dissolved or dispersed in water and an organic liquid or mixtures of such liquids wherein the water and the organic liquid are in a ratio of from 70:30 to 90:10 and the blend has a pH of 10 or above, and is described in E. Sommerfeld, U.S. Pat. application Ser. No. 547,001, filed Feb. 4, 1975, simultaneously with the present application and is hereby incorporated by reference.

Other film-forming materials useful in the dispersed phase of the aqueous dispersion of this invention include acrylic polymers, nitrocellulose, polyamides, and polyvinyl chloride and its copolymers.

The aqueous dispersion of this invention can be applied by a variety of techniques and to a variety of substrates known in industry. Roller, dip, and spray coating, as well as electrodeposition, can be utilized. For example, coatings for bakeware and cookware, made from aluminum or steel, can be obtained by roller or spray coating the aqueous dispersion followed by a baking schedule to be described below.

The aqueous dispersion of this invention can also be electrocoated whenever at least one component of the dispersed phase carries an electrical charge, as is the case, for example, when the film-forming material is a polyamide acid salt or a blend of a polymeric quaternary hydroxide (the reaction product of an epoxy resin with a tertiary amine) and a nitrogen resin crosslinking agent. In the electrodeposition process the aqueous composition is placed in contact with an electrically conductive cathode and an electrically conductive anode, with the surface to be coated being either the anode or the cathode. During the process an adherent film of the coating composition is deposited on the anode, for example when a polyamide acid salt is utilized or on the cathode, for example when the above blend is utilized as the film-former. Electrically noncharged components also migrate, in a possible physical entanglement with the charged components, to the surface to be coated.

The conditions under which the electrocoating is carried out are similar to those used in the electrodeposition of other types of coatings. The applied voltage can be varied, can range from 1 to 1000 volts, and is typically between 25 and 500 volts. The current density is usually between about 1 milliampere and 100 milliamperes per square centimeter. The current density tends to decrease during the coating process as the coating thickness increases. The coating times can vary, usually between 1 to 120 seconds or longer and typically be in the range of 1-5 seconds for coating cans, longer where thicker films are desired.

The concentration of the dispersion depends upon the process parameters to be used and is not generally critical. Ordinarily the dispersed phase comprises 0.1-50% and preferably 5-30% for conventional coating methods and 1-10% for electrodeposition of the total dispersion.

Films obtained from the aqueous dispersions of this invention can be dried and baked in a wide temperature range and up to approximately 370° C. Advantageously, the coated substrates are prebaked at approximately 150° C for 1-30 minutes followed by baking between 200° C and 345° C for periods up to 30 minutes. Films so obtained from the dispersions can contain substantially completely fused polymer or partially or completely particulate perfluoroolefin polymer imbedded in the film-forming material which forms a substantially continuous film.

It is surprising and unexpected that a film obtained from the aqueous dispersions of this invention is not uniform in composition throughout its thickness. That portion of the film at the substrate-film interface is composed predominantly of the film-forming material while the portion at the outer surface, at the film-air interface, is predominately fused and/or particulate perfluoroolefin polymer. The film is not laminar, the space between the interfaces is a blend of the film-forming material and the perfluoroolefin polymer, containing progressively more perfluoroolefin polymer toward the film-air interface.

This non-uniform composition gives highly desirable properties to the film. Having predominantly film-forming material at the substrate-film interface increases the adhesion of such film to the substrate. The predominancy of perfluoroolefin at the film-air interface gives the film high lubricity and chemical resistance and also excellent releases properties. The non-uniformity also allows wide variation of the component ratios, i.e. perfluoroolefin polymer/film-former weight ratios of from 4/1 to 1/4, without reducing, for example, film lubricity since the film has a fairly constant coefficient of friction.

This non-uniformity phenomenon of the films obtained from the aqueous dispersion of this invention makes them useful in fabricating articles requiring durable, lubricious films permanently bonded to the substrate. They are useful, for example, in coating such things as wire, cook- and bakeware, metal foil, ice-cube trays, molds, fuser rolls in xerographic equipment, and the like. The aqueous dispersion can also be used to impregnate, for example, a non-woven glass fiber mat or to prepare coated glass fabrics and laminates. Such laminates have excellent interlaminar adhesion and are useful as electric insulators.

Aqueous dispersions of this invention containing, for example, a polyamide acid salt afford, when fused, finishes which are not only lubricious and well bonded to the substrate but are also highly abrasion and high temperature resistant. These properties remain relatively constant over repeated and prolonged use and make the dispersions especially useful as coatings on cook- and bakewear, saw blades, drills, and the like.

The invention can be further understood by referring to the following examples in which parts and percentages are by weight.

EXAMPLE 1

(a) The following ingredients are charged into a container: A polyamide acid prepared from trimellitic anhydride and bis(4-aminophenyl)methane, having an inherent viscosity (0.5% solution in N,N-dimethylacetamide) of 0.31 and a free acid content of 7.65% by weight, corresponding to 170 milliequivalents of carboxylic acid per 100 grams, 3000 grams; water, 3100 grams; diethyl 2-hydroxyethylamine, 400 grams; triethylamine, 800 grams; furfuryl alcohol, 1200 grams; and N-methylpyrrolidone, 1500 grams. The contents of the vessel are heated for 2.5 hours with agitation between 40° and 58° C, whereupon a clear solution results.

(b) The following ingredients are mixed at room temperature: an aqueous dispersion of a TFE/HFP copolymer having a monomer weight ratio of 85/15, 2963 grams (containing 55% by weight of the copolymer); water, 3977 grams; furfuryl alcohol, 480 grams; a black mill base containing carbon black pigment, a polymeric naphthalene sulfonate, aluminum silicate extender pigment, and water in the weight ratio of 30:3:5:65, 1465 grams; the aqueous solution of the polyamide acid salt described in (a) above, 4448 grams; and N-methylpyrrolidone, 2667 grams. The resulting dispersion has a Brookfield viscosity (number 2 spindle, 20 revolutions per minute) of 1900 centipoises and is sprayed on an aluminum sheet. A 15-minute pre-bake at approximately 175° C is followed by a 15-minute baking period at approximately 345° C. The resulting black coating shows excellent release properties after repeated tests with meat and/or muffins.

EXAMPLE 2

The following ingredients are mixed at room temperature: The TFE/HFP copolymer of Example 1, 242.5 grams; a water/N-methylpyrrolidone 80/20 (by weight) mixture, 282.8 grams; the polyamide acid salt solution as prepared in Example 1(a), 134.7 grams; and a red mill base containing red iron oxide, a polymeric naphthalene sulfonate, and water in the weight ratio of 55:5:40, 44.0 grams. The resulting dispersion is dried and baked as in Example 1. The resulting red coating shows excellent release properties after repeated tests with meat and/or muffins.

EXAMPLE 3

The red mill base of Example 2 is replaced by a green mill base containing chromium oxide, a polymeric naphthalene sulfonate, and water, in a weight ratio of 45:5:50, 44.0 grams. The resulting dispersion is dried and baked as in Example 1. The resulting green coating shows excellent release properties after repeated tests with meat and/or muffins.

EXAMPLE 4

The red mill base of Example 2 is replaced by a white mill base containing titanium oxide, a polymeric naphthalene sulfonate, and water, in the weight ratio of 55:5:40, 44.0 grams. The resulting dispersion is dried and baked as in Example 1. The resulting white coating shows excellent release properties after repeated tests with meat and/or muffins.

EXAMPLE 5

The red mill base of Example 2 is replaced by a yellow mill base containing yellow iron oxide, a polymeric naphthalene sulfonate, and water, in the weight ratio of 45:5:50, 44.0 grams. The resulting dispersion is dried and baked as in Example 1. The resulting yellow coating shows excellent release properties after repeated tests with meat and/or muffins.

EXAMPLE 6

(a) In a suitably equipped vessel are placed an epoxy resin (epoxy equivalent of 2,000–2,500, available from Shell Chemical Company under the trade name of Epon 1007), 600 grams, and 2-butoxy-1-ethanol, 200 grams. To the molten mass obtained in 2 hours at 68°–100° C are added, over a 90-minute period at approximately 70° C, dimethyl 2-hydroxyethylamine, 60 grams, dissolved in water, 180 grams. The reaction temperature is maintained at 70° C for an additional 30 minutes followed by a dilution step using water, 1088 grams, and 2-butoxy-1-ethanol, 272 grams.

(b) A 100-gram portion of the above prepared polymeric quaternary hydroxide is mixed with a partially methylated melamine (80% solids in iso-propanol, "Resimene 731", available from Monsanto Polymers and Petrochemicals Company), 12 grams; an aqueous dispersion of the TFE/HFP copolymer of Example 1, 100 grams; and water, 100 grams.

A portion of this dispersion is sprayed on an aluminum panel, pre-baked at 150° C for 15 minutes, and baked at approximately 343° C for 15 minutes. The resultant clear film is approximately 0.02–0.03 millimeter thick, is hard, and has good adhesion to the substrate.

EXAMPLE 7

(a) To a 214.8-gram portion of the following polymer solution: styrene/acrylonitrile/itaconic acid in a monomer weight ratio of 66.3/20/13.7 [at 51.6% solids content in a solvent mixture of methyl ethyl ketone/2-butoxy-1-ethanol/cyclohexanol (weight ratio of 28.2/42.3/22.5); weight average molecular weight (gel permeation chromatography, using a polystyrene standard) of approximately 30,000] is added an epoxy resin (epoxy equivalent of 875–1025, available from Shell Chemical Company under the trade name of Epon 1004), 90.6 grams. The mixture is heated to 65° C to obtain a solution. Dimethyl 2-hydroxyethylamine, 20.8 grams, is then added over a 1-hour period, accompanied by a 10° C exotherm. After the addition is complete tetraethoxydimethoxymethylmelamine, 34.4 grams, is added and the reaction mixture maintained at 65° C for 30 minutes, followed by the addition of water, 499.4 grams. The product has 27.4% solids content, pH of 9.4, and a Gardner-Holdt viscosity of A-2. [Compositions of this nature are described in Matthews, et al. Ser. No. 413,372, filed Nov. 6, 1973.]

(b) A 92.9-gram portion of the above solution is milled for 20 hours with 7.1 grams of a TFE/HFP copolymer (75/25 weight ratio) resin, having a particle size range of from approximately 0.2 micron aggregating up to approximately 12 microns. After milling 35.2 grams of this dispersion is mixed with cyclohexanol, 5.2 grams, and water, 59.6 grams.

Electrodeposition is carried out by filling a 1-liter tank with the dispersion and positioning a 10 centimeter × 10 centimeter aluminum panel at about the center of the tank. The panel is set to be the anode; application of a direct current voltage of about 100 volts for 2 seconds causes the deposition of a film which is washed, dried, and fused at 204° C for 2 minutes. A thin, smooth, translucent film of excellent lubricity and adherence to the substrate results.

EXAMPLE 8

A 100-gram portion of the polyamide acid salt solution of EXAMPLE 1(a) is mixed with an aqueous dispersion of PTFE, 50 grams (containing 60% by weight of the polymer); water, 105 grams; and N-methylpyrrolidone, 31 grams. When the dispersion is electrodeposited, on steel, as described in Example 7, but applying the direct current voltage for 1 minute, followed by a 315° C/15 minute baking cycle, a smooth, tough, stain and scratch resistant film results.

What is claimed is:

1. An aqueous dispersion coating composition wherein the dispersed phase consists essentially of:
   (A) 20 to 80% by weight, based on the weight of (A) plus (B), of a perfluoroolefin polymer containing 5 to 100% by weight, based on the perfluoroolefin polymer, of tetrafluoroethylene and 95 to 0% by weight, based on the perfluoroolefin polymer, of hexafluoropropylene; and
   (B) 80 to 20% by weight, based on the weight of (A) plus (B), of a film-forming material, said film-forming material being capable of forming a film below the fusion point of the perfluoroolefin polymer and does not decompose at the film forming temperature of said dispersion; wherein the coating resulting from said aqueous dispersion is not uniform in composition throughout its thickness but is composed predominantly of the film-forming material at the substrate-film interface and of the perfluoroolefin polymer at the film-air interface.

2. The aqueous dispersion of claim 1 wherein said perfluoroolefin polymer is polytetrafluoroethylene having a weight average molecular weight, determined by melt viscosity measurements, in excess of 20,000 and its particles having a minimum average dimension of 0.05 micron and a maximum average dimension of 15 microns.

3. The aqueous dispersion of claim 1 wherein said perfluoroolefin polymer is a tetrafluoroethylene/hexafluoropropylene copolymer in a comonomer weight ratio range of 93–95/7–5, having a weight average molecular weight, determined by melt viscosity measurements, in excess of 20,000 and its particles having a minimum average dimension of 0.05 micron and a maximum average dimension of 15 microns.

4. The aqueous dispersion of claim 1 wherein said perfluoroolefin polymer is a tetrafluoroethylene/hexafluoropropylene copolymer in a comonomer weight ratio range of 84–88/16–12, having a weight average molecular weight, determined by melt viscosity measurements, in excess of 20,000 and its particles having a minimum average dimension of 0.05 micron and a maximum average dimension of 15 microns.

5. The aqueous dispersion of claim 1 wherein said perfluoroolefin polymer is a tetrafluoroethylene/hexafluoropropylene copolymer in a comonomer weight ratio range of 75–80/25–20, having a weight average molecular weight, determined by melt viscosity measurements, in excess of 20,000 and its particles having a minimum average dimension of 0.05 micron and a maximum average dimension of 15 microns.

6. The aqueous dispersion of claim 1 wherein said film-forming material is a polyamide acid salt consisting essentially of the non-volatile content of a solution of:
(A) 10 to 70% by weight, based on the solution, of a salt of a polyamide acid with a tertiary amine, wherein the polyamide acid is of the general formula

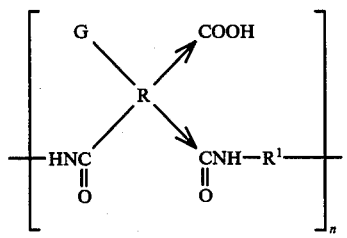

wherein G is a hydrogen atom or a carboxyl group; wherein the → denotes isomerism so that in any recurring unit within the polymeric structure the groups to which the arrows point may exist as shown or in an interchanged position; wherein R is an organic tetravalent radical containing at least two carbon atoms and no more than two carbonyl groups of each polyamide acid unit are attached to any one carbon atom; wherein $R^1$ is a divalent radical containing at least two carbon atoms, the amide groups of adjacent polyamide acid units are attached to separate carbon atoms of said divalent radical; and wherein n is an integer sufficient to provide a polyamide acid having an inherent viscosity of at least 0.1, preferably 0.3–5.0, as measured as a 0.5% solution in N,N-dimethylacetamide at 30° C., and wherein said tertiary amine is present in at least a stoichiometrically equivalent amount to the free carboxylic acid groups in said polyamide acid;
(B) 5 to 25% by weight, based on the solution, of a viscosity reducing agent which is miscible with water and has a solubility parameter range of 10–21.6 wherein said solubility parameter has a dispersion component in the range of 7.0–10.0, a polar component in the range of 2.0–11.0, and a hydrogen bonding component in the range of 7.0–14.0;
(C) 5 to 35% by weight, based on the solution, of a coalescing agent, wherein said coalescing agent is at least one member selected from the group consisting of N-methylpyrrolidone, dimethyl formamide, dimethyl acetamide, dimethyl sulfoxide, cresylic acid, sulfolane, formamide;
and wherein water comprises 30–80% by weight of the solution.

7. The aqueous dispersion of claim 1 wherein said film-forming material is a blend consisting essentially of the non-volatile components of:
(A) a polymeric quaternary ammonium hydroxide prepared from
(a) 50–97 parts by weight, based on the weight of components (a) plus (B), of an epoxy resin containing, on the average, two terminal 1,2-epoxy groups per molecule and having a molecular weight of 350–5,000; reacted with
(b) an aqueous solution of 0.75–1.25 equivalents, per equivalent of epoxy group of said epoxy resin of (a), of a tertiary amine; and
(B) 3–50 parts by weight, based on the weight of components (a) plus (B), of a nitrogen resin crosslinking agent or mixtures thereof; wherein (A) and (B) are dissolved or dispersed in water and an organic liquid or mixture of such liquids wherein the water and said organic liquid are in a ratio of from 70:30 to 90:10 and said blend having a pH of 10 or above.

8. The aqueous dispersion of claim 1 wherein said film-forming material is a blend consisting essentially of the non-volatile components of:
(A) a polymeric quaternary ammonium hydroxide prepared from
(a) 50–97 parts by weight, based on the weight of components (a) and (B), of an epoxy polymer containing, on the average, more than two randomly distributed 1,2-epoxy groups per molecule and selected from the group consisting of: a polyglycidyl ether of a novolac resin having 3–11 epoxy groups per molecule and a molecular weight range of 470–2,00 and an epoxy polymer containing an epoxy-functional monomer, having 10–150 epoxy groups per molecule and a weight average molecular weight, determined by gel permeation chromatography, using a polystyrene standard, of 25,000–75,000; reacted with
(b) an aqueous solution of 0.75–1.25 equivalents, per equivalent of epoxy group of said epoxy resin of (a), of a tertiary amine; and
(B) 3–50 parts by weight, based on the weight of components (a) plus (B), of a nitrogen resin crosslinking agent or mixtures thereof, wherein (A) and (B) are dissolved or dispersed in water and an organic liquid or mixture of such liquids wherein the water and said organic liquid are in a ratio of from 70:30 to 90:10 and said blend having a pH of 10 or above.

9. The aqueous dispersion of claim 1 wherein said film-forming material is a blend consisting essentially of
(A) 35–55 parts, based on the weight of the blend, of a terpolymer of
(a) 10 to 80% by weight of a monomer represented by the structure

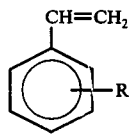

where R is a hydrogen or a mono-valent alkyl radical of 1–2 carbon atoms;
- (b) 15 to 80% by weight of at least one ethylenically unsaturated nitrile monomer, selected from the group consisting of acrylonitrile and methacrylonitrile, and
- (c) 9 to 25% by weight of at least one ethylenically unsaturated acid monomer, selected from the group consisting of acrylic acid, methacrylic acid, and itaconic acid, the total of (a), (b), (c) being 100%, wherein said terpolymer is neutralized with a substantially equivalent amount of water-soluble tertiary amine, and
- (B) 23–53 parts, based on the weight of the blend, of an epoxy resin containing, on the average, two terminal 1,2 epoxy groups per molecule and having a molecular weight of 350–5,000,
- (C) 10–30 parts, based on the weight of the blend, of a nitrogen-resin crosslinking agent.

10. The aqueous dispersion of claim 2 wherein said polytetrafluoroethylene comprises 45–60%, by weight, of the dispersed phase.

11. The aqueous dispersion of claim 3 wherein said tetrafluoroethylene/hexafluoropropylene copolymer comprises 45–60%, by weight, of the dispersed phase.

12. The aqueous dispersion of claim 4 wherein said tetrafluoroethylene/hexafluoropropylene copolymer comprises 45–60%, by weight, of the dispersed phase.

13. The aqueous dispersion of claim 5 wherein said tetrafluoroethylene/hexafluoropropylene copolymer comprises 45–60%, by weight, of the dispersed phase.

14. The aqueous dispersion of claim 6 wherein said film-forming material consists essentially of
- (A) 25–45% by weight, based on the solution, of a salt of a polyamide acid with tertiary amine, wherein the polyamide acid is formed from trimellitic anhydride and bis(4-aminophenyl)methane and wherein the tertiary amine is a 4:1 to 1:4 by weight mixture of triethylamine and diethyl 2-hydroxyethylamine;
- (B) 10–20% by weight, based on the solution, of furfuryl alcohol; and
- (C) 10–25% by weight, based on the solution, of N-methylpyrrolidone.

15. The aqueous dispersion of claim 7 wherein there is also present in the film-forming material an acid catalyst in a quantity sufficient to lower the pH of the blend to between 7.5 and 12.

16. The aqueous dispersion of claim 15 wherein said film-forming material is a blend consisting essentially of the non-volatile components of:
- (A) a polymeric quaternary ammonium hydroxide prepared from
  - (a) 65–85 parts by weight, based on the weight of components (a) plus (B), of an epoxy resin containing, on the average, two terminal 1,2-epoxy groups per molecule and having a molecular weight of 1,000 to 2,500, reacted with
  - (b) an aqueous solution of 0.75–1.25 equivalents, per equivalent of epoxy group of said epoxy resin of (a), of a tertiary amine selected from the group consisting of: trimethyl amine, dimethyl ethyl amine, diethyl methyl amine, N-methyl pyrrolidine, dimethyl ethanol amine, methyl diethanol amine, ethyl methyl ethanol amine, dimethyl propyl amine, dimethyl 3-hydroxy-1-propyl amine, dimethyl 2-hydroxy-1-propyl amine, dimethyl 1-hydroxy-2-propyl amine, and mixtures thereof; and
- (B) 15–35 parts by weight, based on the weight of components (a) plus (B), of a nitrogen resin crosslinking agent or mixtures thereof.

17. The aqueous dispersion of claim 15 wherein said film-forming material is a blend consisting essentially of the non-volatile components of:
- (A) a polymeric quaternary hydroxide prepared from:
  - (a) 65–75 parts by weight, based on the weight of components (a) plus (B), of an epoxy resin containing, on the average, two terminal 1,2-epoxy groups per molecule and having a molecular weight of 4,000–5,000; reacted with
  - (b) an aqueous solution of 0.8–1.2 equivalents, per equivalent of epoxy group of said epoxy resin of (a), of a tertiary amine selected from the group consisting of trimethyl amine, dimethyl ethanol amine or mixtures thereof; and
- (B) 25–35 parts by weight, based on the weight of components (a) plus (B), of a partially methylated melamine crosslinking agent.

18. The aqueous dispersion of claim 6 wherein said film-forming material is the non-volatile content of a solution consisting essentially of:
- (A) 25–45% by weight, based on the solution, of a salt of a polyamide acid with tertiary amine, wherein the polyamide acid is formed from trimellitic anhydride and bis(4-aminophenyl)methane and wherein the tertiary amine is a 4:1 to 1:4 by weight mixture of triethylamine and diethyl 2-hydroxyethylamine;
- (B) 10–20% by weight, based on the solution, of furfuryl alcohol;
- (C) 10–25% by weight, based on the solution, of N-methylpyrrolidone;

and wherein water comprises 30–55% by weight of the solution.

19. The aqueous dispersion of claim 8 wherein there is also present in the film-forming material an acid catalyst in a quantity sufficient to lower the pH of the blend to between 7.5 and 12.

20. The aqueous dispersion of claim 9 wherein said film-forming material is a blend consisting essentially of:
- (A) 45–50 parts by weight, based on the weight of the blend, of a terpolymer of
  - (a) 10 to 80% by weight of a monomer represented by the structure

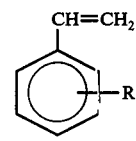

where R is hydrogen or a mono-valent alkyl radical of 1–2 carbon atoms;
- (b) 15 to 25% by weight of at least one ethylenically unsaturated nitrile monomer, selected from the group consisting of acrylonitrile and methacrylonitrile, and (c) 10 to 20% by weight of at least one ethylenically unsaturated acid monomer, selected from the group consisting of acrylic acid, methacrylic acid, and itaconic acid, the total of (a), (b), (c) being 100%, wherein said terpolymer is neutralized with a substantially equivalent amount of water-soluble tertiary amine, (B) 30–40 parts by weight, based on the weight of the blend, of an epoxy resin containing, on the average, two terminal 1,2 epoxy groups per molecule and having a molecular weight of 1,500–2,500, and (C) 10–20 parts by weight, based on the weight of the blend, of a nitrogen resin crosslinking agent.

21. An aqueous dispersion, wherein the dispersed phase consists essentially of (A) 45 to 60% by weight, based on the weight of (A) plus (B), of a perfluoroolefin polymer containing 75 to 100% by weight, based on the perfluoroolefin polymer, of tetrafluoroethylene and 25 to 0% by weight, based on the perfluoroolefin polymer, of hexafluoropropylene; and (B) 40 to 55% by weight, based on the weight of (A) plus (B), of a film-forming material wherein said film-forming material is the non-volatile content of a solution consisting essentially of (a) 25–45% by weight, based on the solution, of a salt of a polyamide acid with tertiary amine, wherein the polyamide acid is formed from trimellitic anhydride and bis(4-aminophenyl)methane and wherein the tertiary amine is a 4:1 to 1:4 by weight mixture of triethylamine and diethyl 2-hydroxyethylamine;

(b) 10–20% by weight, based on the solution, of furfuryl alcohol;

(c) 10–25% by weight, based on the solution, of N-methylpyrrolidone;

and wherein water comprises 30–55% by weight of the solution.

22. An aqueous dispersion, wherein the dispersed phase consists essentially of:

(A) 45 to 60% by weight, based on the weight of (A) plus (B), of a perfluoroolefin polymer containing 75 to 100% by weight, based on the perfluoroolefin polymer, of tetrafluoroethylene and 25 to 0% by weight, based on the perfluoroolefin polymer, of hexafluoropropylene; and (B) 40 to 55% by weight, based on the weight of (A) plus (B), of a film-forming material wherein said film-forming material is the non-volatile content of a blend consisting essentially of:

(1) a polymeric quaternary hydroxide prepared from:

(a) 65–85 parts by weight, based on the weight of components (a) plus (2), of an epoxy resin containing, on the average, two terminal 1,2-epoxy groups per molecule and having a molecular weight of 1,000 to 2,500, reacted with (b) an aqueous solution of 0.75–1.25 equivalents, per equivalent of epoxy group of said epoxy resin of (a), of a tertiary amine selected from the group consisting of: trimethyl amine, dimethyl ethyl amine, diethyl methyl amine, N-methyl pyrrolidine, dimethyl ethanol amine, methyl diethanol amine, ethyl methyl ethanol amine, dimethyl propyl amine, dimethyl 3-hydroxy-1-propyl amine, dimethyl 2-hydroxy-1-propyl amine, dimethyl 1-hydroxy-2-propyl amine, and mixtures thereof; and (2) 25–35 parts by weight, based on the weight of components (a) plus (2), of a partially methylated melamine crosslinking agent;

wherein (1) and (2) are dissolved or dispersed in water and an organic liquid or mixture of such liquids wherein the water and said organic liquid are in a ratio of from 70:30 to 90:10 and said blend having a pH of 10 or above.

23. An aqueous dispersion, wherein the dispersed phase consists essentially of:

(A) 45 to 60% by weight, based on the weight of (A) plus (B), of a perfluoroolefin polymer containing 75 to 100% by weight, based on the perfluoroolefin polymer, of tetrafluoroethylene and 25 to 0% by weight, based on the perfluoroolefin polymer, of hexafluoropropylene; and (B) 40 to 55% by weight, based on the weight of (A) plus (B), of a film-forming material wherein said film-forming material is a blend consisting essentially of:

(1) 45–50 parts by weight, based on the weight of the blend, of a terpolymer of (a) 10 to 80% by weight of a monomer represented by the structure $$\underset{\text{phenyl}}{\text{C}_6\text{H}_4(\text{R})}-\text{CH}=\text{CH}_2$$

where R is hydrogen or a mono-valent alkyl radical of 1–2 carbon atoms;

(b) 15 to 25% by weight of at least one ethylenically unsaturated nitrile monomer, selected from the group consisting of acrylonitrile and methacrylonitrile, and (c) 10 to 20% by weight of at least one ethylenically unsaturated acid monomer, selected from the group consisting of acrylic acid, methacrylic acid, and itaconic acid, the total of (a), (b), (c) being 100%, wherein said terpolymer is neutralized with a substantially equivalent amount of water-soluble tertiary amine, (2) 30–40 parts by weight, based on the weight of the blend, of an epoxy resin containing, on the average, two terminal 1,2 epoxy groups per molecule and having a molecular weight of 1,500–2,500, and (3) 10–20 parts by weight, based on the weight of the blend, of a nitrogen resin crosslinking agent.

24. An aqueous dispersion, wherein the dispersed phase consists essentially of:

(A) 50–55% by weight, based on the weight of (A) plus (B), of a tetrafluoroethylene/hexafluoropropylene copolymer in a comonomer weight ratio range of 84–88/16–12, having a weight average molecular weight, determined by melt viscosity measurements, in excess of 20,000 and its particles having a minimum average dimension of 0.05 micron and a maximum average dimension of 15 microns; and (b) 45–50% by weight, based on the weight of (A) plus (B), of a film-forming material wherein said film-forming material is the non-volatile content of a solution consisting essentially of
(a) 25–45% by weight, based on the solution, of a salt of a polyamide acid with tertiary amine, wherein the polyamide acid is formed from trimellitic anhydride and bis(4-aminophenyl)methane and wherein the tertiary amine is a 4:1 to 1:4 by weight mixture of triethylamine and diethyl 2-hydroxyethylamine;
(b) 10–20% by weight, based on the solution, of furfuryl alcohol;
(c) 10–25% by weight, based on the solution, of N-methylpyrrolidone;

and wherein water comprises 30–55% by weight of the solution.

25. An aqueous dispersion, wherein the dispersed phase consists essentially of:
(A) 50–55% by weight, based on the weight of (A) plus (B), of a tetrafluoroethylene/hexafluoropropylene copolymer in a comonomer weight ratio range of 75–80/20–25, having a weight average molecular weight, determined by melt viscosity measurements, in excess of 20,000 and its particles having a minimum average dimension of 0.05 micron and a maximum average dimension of 15 microns; and
(B) 45–50% by weight, based on the weight of (A) plus (B), of a film-forming material wherein said film-forming material is the non-volatile content of a solution consisting essentially of
(a) 25–45% by weight, based on the solution, of a salt of a polyamide acid with tertiary amine, wherein the polyamide acid is formed from trimellitic anhydride and bis(4-aminophenyl)methane and wherein the tertiary amine is a 4:1 to 1:4 by weight mixture of triethylamine and diethyl 2-hydroxyethylamine;
(b) 10–20% by weight, based on the solution, of furfuryl alcohol;
(c) 10–25% by weight, based on the solution, of N-methylpyrrolidone;

and wherein water comprises 30–55% by weight of the solution.

26. An aqueous dispersion, wherein the dispersed phase consists essentially of:
(A) 20–30% by weight, based on the weight of (A) plus (B), of a perfluoroolefin polymer containing 75 to 100% by weight, based on the perfluoroolefin polymer, of tetrafluoroethylene and 25 to 0% by weight, based on the perfluoroolefin polymer, of hexafluoropropylene; and
(B) 70–80% by weight, based on the weight of (A) plus (B), of a film-forming material wherein said film-forming material is the non-volatile content of a solution consisting essentially of
(a) 25–45% by weight, based on the solution, of a salt of a polyamide acid with tertiary amine, wherein the polyamide acid is formed from trimellitic anhydride and (bis-4-aminophenyl)methane and wherein the tertiary amine is a 4:1 to 1:4 by weight mixture of triethylamine and diethyl 2-hydroxyethylamine;
(b) 10–20% by weight, based on the solution, of furfuryl alcohol;
(c) 10–25% by weight, based on the solution, of N-methylpyrrolidone;

and wherein water comprises 30–55% by weight of the solution.

27. An aqueous dispersion, wherein the dispersed phase consists essentially of:
(A) 20–30% by weight, based on the weight of (A) plus (B), of a perfluoroolefin polymer containing 75 to 100% by weight, based on the perfluoroolefin polymer, of tetrafluoroethylene and 25 to 0% by weight, based on the perfluoroolefin polymer, of hexafluoropropylene; and
(B) 70–80% by weight, based on the weight of (A) plus (B), of a film-forming material wherein said film-forming material is the non-volatile content of a blend consisting essentially of:
(1) a polymeric quaternary hydroxide prepared from:
(a) 65–85 parts by weight, based on the weight of components (a) plus (2), of an epoxy resin containing, on the average, two terminal 1,2-epoxy groups per molecule and having a molecular weight of 1,000 to 2,500, reacted with
(b) an aqueous solution of 0.75–1.25 equivalents, per equivalent of epoxy group of said epoxy resin of (a), of a tertiary amine selected from the group consisting of: trimethyl amine, dimethyl ethyl amine, diethyl methyl amine, N-methyl pyrrolidine, dimethyl ethanol amine, methyl diethanol amine, ethyl methyl ethanol amine, dimethyl propyl amine, dimethyl 3-hydroxy-1propyl amine, dimethyl 2-hydroxy-1-propyl amine, dimethyl 1-hydroxy-2-propyl amine, and mixtures thereof; and
(2) 25–35 parts by weight, based on the weight of components (a) plus (2), of a partially methylated melamine crosslinking agent;

wherein (1) and (2) are dissolved or dispersed in water and an organic liquid or mixture of such liquids wherein the water and said organic liquid are in a ratio of from 70:30 to 90:10 and said coating composition having a pH of 10 or above.

* * * * *